United States Patent Office 3,310,386
Patented Mar. 21, 1967

3,310,386
PREPARATION OF PLUTONIUM OXIDE SOL AND CALCINED MICROSPHERES
Milton H. Lloyd, Oak Ridge, Tenn., assignor to the United States of America as represented by the United States Atomic Energy Commission
No Drawing. Filed Sept. 10, 1965, Ser. No. 486,572
5 Claims. (Cl. 23—344)

This invention relates generally to nuclear fuels and more specifically to a method for preparing plutonium sols. Such sols are useful in the preparation of plutonium oxide solid reactor fuels, plutonia microspheres, and mixed oxide fuel microspheres.

Plutonium is a highly versatile material. Plutonium oxide, in the form of dense microspheres, is useful as a nuclear fuel for both thermal and fast breeder reactors. Additionally, certain isotopes of plutonium are being investigated as potential heat sources for particular application, such as in the Aero-Space programs. For such uses, it is desirable to provide the plutonium in particle form which is amenable to subsequent fabricational processes. One recent method for preparing particles is the "sol-gel" process disclosed in U.S. Patent No. 2,035,895, issued May 22, 1962, in the names of Kenneth H. McCorkel et al. for "Preparation of High-Density Compactible Thorium Oxide Particles." There thorium oxide particles were prepared which were highly suited for vibratory compaction into tubular fuel elements. Alternately, the thorium oxide sol may be dispersed in a slightly water-soluble, immiscible organic liquid, suspended therein until enough water is extracted to cause gelation and, subsequently, calcined into dense microspheres.

While such a process has been highly successful in preparing thoria and thoria-urania (with uranium concentrations limited to a maximum of about 10 percent), it has been completely ineffectual in preparing plutonium sols. This is generally attributed to the inability of obtaining plutonium in a dispersed state. When such techniques as employed in prior processes were used, insoluble hydrous plutonia resulted which could not be dispersed as a sol. To date the only success with plutonium has been in sorbing small quantities of the plutonyl ion on sol-dispersed thoria. Unfortunately, the plutonium oxide concentration is limited to not more than about 4 mole percent of the total metal. Thus, it is highly desirable to not only provide a method for preparing plutonium sols which may be processed singularly into plutonium microspheres and/or tubular elements, but also providing a method for preparing a plutonium sol which is compatible over a wide range of plutonium concentrations with other actinide sols for the fabrication of mixed oxide fuels.

Accordingly, an object of this invention is to provide a method for preparing a stable plutonium sol.

Another object is to prepare plutonium oxide sols which are suitable for fabrication into high density, solid reactor fuel particles.

A further object is to prepare plutonium oxide sols which are suitable for fabrication by vibratory compactions into tubular fuel elements.

Still another object is to prepare plutonium oxide sols which are compatible with other actinide sols for fabrication of mixed oxide fuels.

Briefly, the method of this invention comprises (1) rapidly precipitating hydrous plutonium oxide from a nitric acid solution containing tetravalent plutonium by neutralization of plutonium nitrate and excess acid with a strong base, (2) washing the resulting precipitate, (3) dispersing said precipitate in an aqueous solution containing between 1–4 moles nitric acid per mole plutonium, (4) heating the resulting dispersion under agitation at a temperature of between 60° and 80° C. until a first sol is formed, (5) evaporating said first sol to dryness, (6) heating the resulting dried solid at a temperature below 200° C. until the residual nitrate content is within the range of from 0.4 to 0.1 mole per mole plutonium, and (7) dispersing the resulting solid in water thereby forming a second, low-nitrate stable sol. By this method, stable plutonium sols containing from about 1–3 molar plutonium have been obtained which are highly suited for subsequent fabrication into reactor fuels. Such sols may conveniently be evaporated to gel fragments, which are suitable for vibratory compaction into fuel elements, or fabricated into high density microspheres. The plutonium sol obtained has been found to be compatible with other sols, such as thoria and uranium oxide sols, and may be utilized as a starting material for making mixed oxide microspheres or other forms of refractory fuels.

Due to the ease of polymerization and disproportionation of plutonium, the initial solution which contains the tetravalent plutonium should contain a plutonium and free acid concentration that would permit storing plutonium in an unpolymerized state. For this a plutonium concentration of about 50–60 grams/liter in 1–4 M nitric acid solution has been found to be quite satisfactory.

In the first step of the process the plutonium is precipitated as plutonium hydroxide or a hydrous oxide of plutonium. The term "plutonium hydroxide" as hereinafter employed will be understood to include the term "hydrous oxide." In this phase of the process it's important to employ a strong base which does not introduce any ions which are difficult to remove in subsequent steps; and while any strong base may be employed, ammonium hydroxide has been found to be highly suitable in this respect and is preferred. In carrying out this precipitation, it is preferred to precipitate the plutonium in such fashion as to minimize the formation of plutonium polymer. If the excess nitric acid is slowly neutralized during the precipitation, there is a tendency for the plutonium to undergo excessive polymerization which would deleteriously affect the particle size range obtained, i.e., particles would be larger than sol range. The particular method for accomplishing the plutonium hydroxide precipitation is not critical provided neutralization is effected as above. For example, the precipitation step may be carried out by the rapid addition of ammonium hydroxide to the plutonium nitrate solution. Where this procedure is employed, the quantity of ammonium hydroxide added should be stoichiometrically equivalent to the total plutonium and hydrogen ion concentration. It will be apparent that all of the free acid must be neutralized (as indicated by a pH of 6–8) before the plutonium nitrate is converted to the hydroxide form; hence, a quantity of ammonium hydroxide which is stoichiometrically equivalent to both the Pu (IV) and the H+ concentration should be used.

An alternate method for precipitating the plutonium hydroxide may comprise dropwise addition of dilute plutonium nitrate solution to an excess of ammonium hydroxide solution. Where the rapid addition of ammonium hydroxide to the plutonium nitrate solution is employed, it is thought that the particle size range of the resulting sol upon peptization or resuspension is on the high side of the sol range. On the other hand, where the dropwise addition of dilute plutonium to an ammonium hydroxide solution is employed, the particle size range of the resulting sol appears to be somewhat lower and well within the sol range. This aspect of the invention will be described hereinafter in greater details in conjunction with the respective examples presented.

After the plutonium hydroxide is precipitated, the precipitate is washed to remove ammonium nitrate and, where the dropwise addition is used, any excess ammonium hydroxide. For this, multiple water washes with dewatering without drying may be employed until the washings show a pH less than 8. Inasmuch as air-dried material can obtain a nondispersible condition, care should be taken to prevent air drying during these water washes.

The washed plutonium hydroxide is next resuspended in an aqueous solution by adding, with continuous stirring, sufficient water to provide a suspension containing 20–25 grams of plutonium per liter. In order to cause sol formation from the hydroxide precipitate, it is necessary to introduce nitrate at a comparatively high nitrate-to-plutonium ratio. For these plutonium concentrations, i.e., 20–25 grams per liter, a minimum ratio of 1.0 mole $HNO_3$ per mole plutonium in suspension has been found to be necessary to form stable sols, and ratios as high as 4 can be used.

It will be apparent to those skilled in the art that, inasmuch as the number of theoretical active sites of the plutonium hydroxide which may serve as sorption sites for the nitrate ions is four, the nitrate addition should probably not exceed four moles nitrate per mole plutonium. Moreover, inasmuch as ionic plutonium which may exist due to de-polymerization of the plutonium polymer, is highly undesirable, the nitrate addition should be kept to a minimum to preclude oxidation of any ionic plutonium to plutonium (VI) during subsequent digestion at elevated temperatures. That this is undesirable may be seen from the fact that, if any plutonium (VI) is present in the macro-structure during subsequent calcination of the plutonium hydroxide to plutonium oxide, the plutonium (VI) will undergo a phase change, resulting in possible destruction of the macro-structure. Accordingly nitrate ratios between 1–4 moles per mole plutonium are required and may conveniently be provided by the addition of nitric acid.

The suspension is then digested under agitation to form a sol. Although the digestion temperature is not critical, it is preferred to heat the system to obtain a faster reaction. Temperatures above about 50° C. up to the boiling point of the solution may be employed with a temperature between 60° and 80° C. preferred. Digestion at constant volume should be maintained until a nearly clear, dark green suspension is obtained, requiring for example about four hours. Although this treatment produces a true sol, as evidenced by the Tyndall effect, this sol does not form satisfactory plutonia solids until partial nitrate removal has been accomplished by evaporating to dryness and baking. If such sols are evaporated to dryness and calcined, porous, low density, friable $PuO_2$ fragments are obtained which are not suitable for vibratory compaction into high density fuel elements. Equally unacceptable product is formed when such sols are used to prepare microspheres. Only gel fragments and broken spheres are obtained. In addition, such high nitrate sols are not compatible with other actinide sols which prevents the formation of mixed oxide fuels.

Unlike thoria, for example, plutonium sol formation is effected by polymerization of the plutonium in this first resuspension operation with the ultimate particle size resulting from polymerization, and it is suspected that the degree of polymerization is controlled by process variables, i.e., nitrate concentration, temperature, plutonium concentration and reaction time.

After peptization is completed, the plutonium sol is evaporated to dryness. Temperatures employed here should preferably be below the boiling point of the suspension ($\sim$100° C.). The dried gel fragements are then baked at an elevated temperature for a period of time sufficient to reduce the nitrate content to a minimum value which is consonant with resuspension of the solids to form a sol. By this it is meant that, while it would be desirable, if possible, to remove essentially all of the nitrate at this point so that none remained to be volatilized off during calcination, a certain amount of nitrate has been found necessary to resuspend the solids and form a stable sol. For this applicant has found that minimum nitrate concentrations between 0.1 and 0.4 mole per mole of plutonium afforded stable sol production. A temperature of about 120° C. with baking times between 8–12 hours have been found to be quite adequate and are preferred. It will be appreciated that it is critical to the successful practice of this invention that the nitrate content be reduced to a minimum as defined above in this denitration step so as to present a minimum nitrate content which will be driven off during subsequent calcination. Residual nitrate concentrations above 0.4 mole per mole plutonium resulted in unstable sols evidenced by layering and rapid settling. On the other hand, residual nitrate concentrations below about 0.1 mole per mole plutonium did not provide sufficient nitrate necessary for resuspension of the solid as a sol. Final resuspension is effected by dispersing the dried low-nitrate gel in water (one liter of water per 1–3 moles of plutonium) with stirring. Formation of a stable sol is evidenced by failure of the dispersed solids to settle upon allowing the dispersed mixture to stand.

Fabrication of the plutonium oxide and/or mixed oxide sols into nuclear fuels may conveniently be effected in one of two ways. Where the plutonium oxide is to be made into tubular elements via vibratory compaction, the plutonium oxide sol may be placed in shallow drying trays and evaporated, under controlled conditions, to dried gel fragments. This method, which relates generally to preparation of compactible thorium oxide fragments containing minor portions of uranium-233, is described fully in a paper by Sam D. Clinton presented at the Argonne Seminar on December 18, 1964. There it was found upon drying at elevated temperatures to the solid state, the sol fractured into fragments the size of which varied with the drying rate and the depth of material in the drying tray.

The dried gel fragments are then fired to produce dense oxide particles. Firing temperatures of at least 1100° C. are required for high density, and in order to achieve maximum density the gel fragments should be heated to a temperature of about 1150° C. which should be held for at least one hour. The resulting particles exhibit high density, typically 95–99 percent of theoretical and a hard vitreous structure well-suited for vibratory compaction. Similarly, mixed oxides of plutonium and thorium may be fabricated into tubular fuel elements by drying the gel to sized fragments which are calcined and then compacted into tubular elements of above 90 percent theoretical density.

In an alternate mbodiment of fabricating the low nitrate stable plutonium sol and/or mixed oxides of plutonium and thorium into reactor fuels, the plutonium sol which may contain from 1–3 molar plutonium, is passed into a sphere-forming column. Such an apparatus is disclosed in S.N. 385,813, filed July 28, 1964, now Patent No. 3,290,122, in the names of Sam D. Clinton et al., for "Process and Apparatus for Preparing Oxide Gel Microspheres From Sols." To illustrate: The stable sol comprising about 1 M plutonium is passed into the tapered column concurrently with an organic drying agent, such as 2-ethyl-1-hexanol, and dispersed into droplets which are dehydrated to gel microspheres. The gel microspheres are collected at the bottom of the column, removed, air-dried and calcined at 1150° C. to produce plutonium oxide microspheres. Toluene density determinations indicated the density of the calcined microspheres as being greater than 95% theoretical density.

Further illustration of the quantitative aspects and procedures of the present invention is provided in the following examples. Example I demonstrates the general procedure and techniques for preparing stable plutonium sols and Examples II and III demonstrate the inability of preparing useful plutonia fuels from the first high nitrate sol; Examples IV and V illustrate the preparation of plutonium and/or mixed oxide microspheres from the stable plutonium sol prepared in accordance with the present process.

EXAMPLE I

A number of plutonium sols were prepared to determine the minimum nitrate to plutonium ratio required to peptize the plutonium hydroxide as well as the minimum nitrate concentration which could be obtained in a final sol preparation. The same general procedure and techniques were employed for each sol preparation and consisted of the following operations.

Precipitation

Each plutonium sol was prepared as follows: 150 ml. of 2 M ammonium hydroxide was quickly added, with rapid agitation, to each 50 ml. of aqueous 2 M nitric acid feed solution containing various concentrations of tetravalent plutonium. The pH of the precipitated plutonium hydroxide slurry was rapidly adjusted to between 6 to 8 with ammonium hydroxide when necessary, indicating complete plutonium precipitation with no appreciable excess ammonium hydroxide in solution.

Alternately, several plutonium sols (runs 5–9) were prepared by adding dropwise, with agitation, one liter volume of plutonium nitrate solution, which contained 2 M nitric acid with plutonium concentrations in the range of 12–24 gram/liter, to one liter of solution which contained a two-fold stoichiometric excess of ammonium hydroxide.

Washing

The respective solutions were then filtered and the filter cakes containing the precipitated plutonium hydroxide were dispersed in approximately 500–1000 ml. of water, respectively, agitated to slurry and refiltered. The resulting precipitates were water washed with 500–1000 ml. of water each time until the pH of the wash water was 8.0 or less; this generally required about three washings.

Soling

Sol formation was effected by resuspending with agitation the washed plutonium hydroxide precipitates in sufficient water to provide a plutonium concentration of about 0.1 M. The minimum nitrate to plutonium ratio which was necessary for stable sol formation was determined by step-wise additions of 0.46 M nitric acid to the respective solutions with digestion at a temperature of about 70° C. This end point was determined when all of the plutonium hydroxide remained permanently in solution after setting for 24 hours. There was a color change in the solution at this end point from light green to a nearly transparent dark green (characteristic of plutonium polymer). The step-wise acid addition was effected by adding a given quantity of 0.46 M nitric acid to the solution, digesting the solution for approximately 6.5 hours at 70° C. and allowing the solution to stand overnight to see if all of the plutonium remained in solution or settled out. This was repeated at day-intervals until all of the plutonium remained in suspension.

Denitration

The respective sols were next denitrated to determine the minimum nitrate content which could be obtained while still being able to resuspend the baked gel. Each sol was first evaporated to dryness by heating the solutions at 80° C.; the dried solids were then baked at 120°–200° C. to denitrate the sol. The baking step was carried out in a step-wise fashion to obtain a minimum nitrate content. With baking temperatures of 120° C., the evaporated sols were baked first for approximately 6 hours, then resuspended in sufficient water to provide a plutonium concentration of about 0.5 to 1.0 molar. This phase was continued by subsequent baking steps for shorter periods of time, followed by resuspension in water until a small quantity of solids could not be resuspended. This point was taken as the lowest nitrate content which would permit resuspension of the major portion of the plutonium hydroxide.

Final resuspension

The low-nitrate gels were then dispersed in water (1 liter of water per 1–3 moles plutonium with stirring). Formation of stable plutonium sol was evidenced by the fact that all of the plutonium hydroxide remained permanently in solution. The resulting sols were then concentrated by evaporation to the maximum plutonium concentration consistent with a fluid sol.

Results

The results obtained from the various sol preparations are shown in Table I below.

From the date given, it may be seen that it is necessary that nitrate be introduced at a comparatively high ratio in order to completely peptize the washed plutonium hydroxide. Ratios below 1.0 mole nitric acid per mole plutonium result in unpeptized hydroxide, while nitrate ratios above 1 reduced the digestion time necessary for complete peptization and in general appeared to increase the maximum plutonium concentration obtainable in the final sol. Nitrate ratios above 4 were not investigated because lower ratios appear to be adequate and plutonium oxidation could result from excessive nitrate addition.

The various sols having nitrate/plutonium mole ratios ranging from 0.12 to 0.40 were found to have good sol stability, adequate for subsequently processing, with the exception of run 7 which was not taken to minimum nitrate concentration.

TABLE I

| | Precipitation Step | Soling Step | | | Denitration | | Final Product | |
|---|---|---|---|---|---|---|---|---|
| Runs | Pu Conc., mg./ml. | Acid Add., ml. | Digestion Time, Hours | NO$_3$/Pu, Mole Ratio | Temp., °C. | Baking Time, Hours | Pu Conc., M | NO$_3$/Pu, Mole Ratio |
| 1 | 242 | 66 | 24 | 0.9 | 120 | 8.5 | 0.84 | 0.12 |
| 2 | 57 | 231 | 22 | 1.0 | 120 | 9.0 | 0.91 | 0.38 |
| 3 | 57 | 280 | 27 | 1.2 | 120 | 10.0 | 1.05 | 0.33 |
| 4 | 57 | 300 | 13 | 1.0 | 120 | 8.0 | 0.90 | 0.28 |
| 5 | 21 | 228 | 4 | 1.0 | 200 | 2.0 | 1.40 | 0.05 |
| 6 | 16.5 | 456 | 0.25 | 2.0 | 200 | 1.5 | 1.90 | 0.40 |
| 7 | 12.0 | 113 | 0.25 | 4.0 | 200 | 2.0 | 1.90 | ¹ 0.74 |
| 8 | 12.0 | 75.5 | 0.25 | 2.0 | 200 | 1.5 | 3.20 | 0.36 |
| 9 | 24.0 | 535 | 0.25 | 2.5 | 200 | 1.5 | 2.80 | 0.29 |

¹ Not taken to minimum nitrate.

EXAMPLE II

A first high nitrate sol, prepared as in Example I, was evaporated to dryness at 80° C. This solid was calcined in air at 1150° C. for four hours. The calcined solid fragments were very porous and extremely fragile and were otherwise unsuitable for subsequent vibratory compaction into tubular fuel elements.

EXAMPLE III

A first high nitrate sol, prepared as in Example I, was evaporated at 80° C. until a plutonium concentration of 1.6 M was obtained. The concentrated sol was introduced into a sphere-forming column at a constant flow rate of 0.2 ml./min. concurrently with an organic drying agent (80 vol. percent 2-methyl-1-penanol–20 vol. percent 2-octanol). Solids formation was such that only small slivered fragments were obtained during the drying operation.

As an alternate, attempts were made to denitrate the first sol, prepared as in Example I, by introducing the sol into the sphere-forming column concurrently with an organic drying agent which contained about 10% Primene JMT, a primary amine. Similarly, only fragments which were highly porous and very fragile were obtained during the drying operation.

EXAMPLE IV

Plutonium microspheres were prepared from the stable sols prepared in Example I as follows: The sol was passed into the tapered column at a constant flow rate of 0.2 ml./min. concurrently with an organic drying agent (80 vol. percent 2-ethyl-1-hexanol–20 vol. percent 2-octanol–0.2 vol. percent Span 80). The sol droplets which form were suspended in the column by the upward flow of the drying agent. The droplets were dehydrated to gel miscrospheres after a 10 minute residence time in the column, and the set spheres removed from the bottom of the column, air dried for 16–24 hours and calcined at 1150° C. for 4–6 hours. The resultant plutonium microspheres (150–250μ) were very hard, vitreous-appearing spheres with a high luster. Toluene density determinations indicated a density of 95–99% of theoretical $PuO_2$.

While the particle size range of the calcined plutonium microspheres prepared in accordance with this example ranged from 150–250μ, it will be apparent that the final calcined product size may vary over a wide range, depending upon the sphere-forming column parameters. Calcined plutonium microspheres ranging from 1–1000 microns may be fabricated from the stable plutonium sols prepared in accordance with the present process.

EXAMPLE V

Mixed plutonium oxide-thorium oxide microspheres containing approximately 50% by weight $PuO_2$ were prepared as follows: 47 ml. of plutonium sol, prepared as in Example I, containing 11.28 grams of plutonium was mixed with 23.4 ml. 2 M steam denitrated thoria sol (containing 12.80 grams thoria). It should be noted that 11.28 grams of plutonium forms 12.8 grams $PuO_2$ after calcination. This quantity of thoria was calculated to provide a calcined product containing approximately 50 weight percent each of plutonia and thoria.

The sol mixture was concentrated by evaporation to a metal concentration of about 2 M and microspheres were formed from the mixture in the same manner as in Example IV.

The calcined oxide spheres were found to be very hard, vitreous-appearing similar to the product plutonium microspheres of Example IV.

What is claimed is:
1. A method for preparing a plutonium oxide sol for nuclear reactor fuel fabrication comprising the steps of:
   (a) rapidly precipitating hydrous plutonium oxide from a nitric acid solution containing tetravalent plutonium by neutralization of plutonium nitrate and excess acid with a strong base,
   (b) washing the resulting precipitate,
   (c) dispersing said precipitate in an aqueous solution containing between 1–4 moles nitric acid per mole of plutonium,
   (d) heating the resulting dispersion under agitation at a temperature between 60°–80° C. until a first sol is formed,
   (e) evaporating said first sol to dryness,
   (f) heating the resulting dried solid at a temperature below 200° C. until the residual nitrate content is 0.4 to 0.1 mole per mole plutonium, and
   (g) dispersing the resulting solid in water hereby forming a second, low-nitrate stable sol.

2. The method of claim 1 wherein said tetravalent plutonium is at a concentration of about 50–60 grams/liter in 1–4 M nitric acid solution and said strong base is ammonium hydroxide.

3. The method of claim 1 wherein said second, low-nitrate sol is evaporated to dryness at a temperature between 80°–100° C. thereby forming dried gel fragments, said gel fragments thereafter being calcined at a temperature of at least 1100° C.

4. The method of claim 1 wherein said second, low-nitrate sol is mixed with a sol selected from the group consisting of urania, thoria, or mixtures thereof and said mixture evaporated to dryness at a temperature between 80°–100° C. thereby forming dried gel fragments, said gel fragments thereafter being calcined at a temperature of at least 1100° C.

5. Calcined plutonia microspheres having a density of at least 95% theoretical and an average particle diameter between 1–1000 microns.

References Cited by the Examiner

AEC Document, TID–11494, 1961, pp. 24–25.

Jones et al., Prep. and Prop. of Plutonium-Bearing Oxide Particulates, Nuclear Science Abstracts, Volume 18, No. 15, Abstract No. 26008, 1964.

CARL D. QUARFORTH, *Primary Examiner.*

BENJAMIN R. PADGETT, *Examiner.*

S. TRAUB, *Assistant Examiner.*